(12) United States Patent
Khan

(10) Patent No.: US 7,782,975 B2
(45) Date of Patent: Aug. 24, 2010

(54) PULSE TRAIN CARRIER-LESS MODULATOR USING SAW FILTERS

(75) Inventor: Nadeem A. Khan, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 588 days.

(21) Appl. No.: 11/897,648

(22) Filed: Aug. 31, 2007

(65) Prior Publication Data

US 2008/0056335 A1    Mar. 6, 2008

Related U.S. Application Data

(60) Provisional application No. 60/842,323, filed on Sep. 5, 2006.

(51) Int. Cl.
*H04L 27/00* (2006.01)
(52) U.S. Cl. ............................ 375/295; 375/256; 455/91
(58) Field of Classification Search ................. 375/256, 375/257, 259, 285, 295, 299; 455/91, 101, 455/115.1; 332/118, 185
See application file for complete search history.

(56) References Cited

U.S. PATENT DOCUMENTS

| 5,862,458 | A | * | 1/1999 | Ishii ........................... 455/107 |
| 6,505,032 | B1 | | 1/2003 | McCorkle et al. |
| 6,778,814 | B2 | * | 8/2004 | Koike .......................... 455/95 |
| 6,998,912 | B2 | * | 2/2006 | Kushitani et al. ............. 330/51 |
| 2005/0249245 | A1 | | 11/2005 | Hazani et al. |

* cited by examiner

*Primary Examiner*—Dac V Ha
(74) *Attorney, Agent, or Firm*—Dennis L. Cook

(57) ABSTRACT

A system and method of carrier-less modulation is described in this disclosure that uses SAW filters as a modulator in addition to their conventional use as filters for band limiting an UWB system. This system and method is primarily designed to be used with any integer cycle, ultra-wide band or impulse type modulation and more particularly is designed to work with a method of modulation named xG Flash Signaling. This technique exploits the impulse response of the SAW filter by exciting the filter with a narrow pulse train producing a carrier-less impulse radio system with limited bandwidth, low average power, but high peak power.

4 Claims, 5 Drawing Sheets

Block diagram of modulator

Figure 1: Frequency response of SAW filter
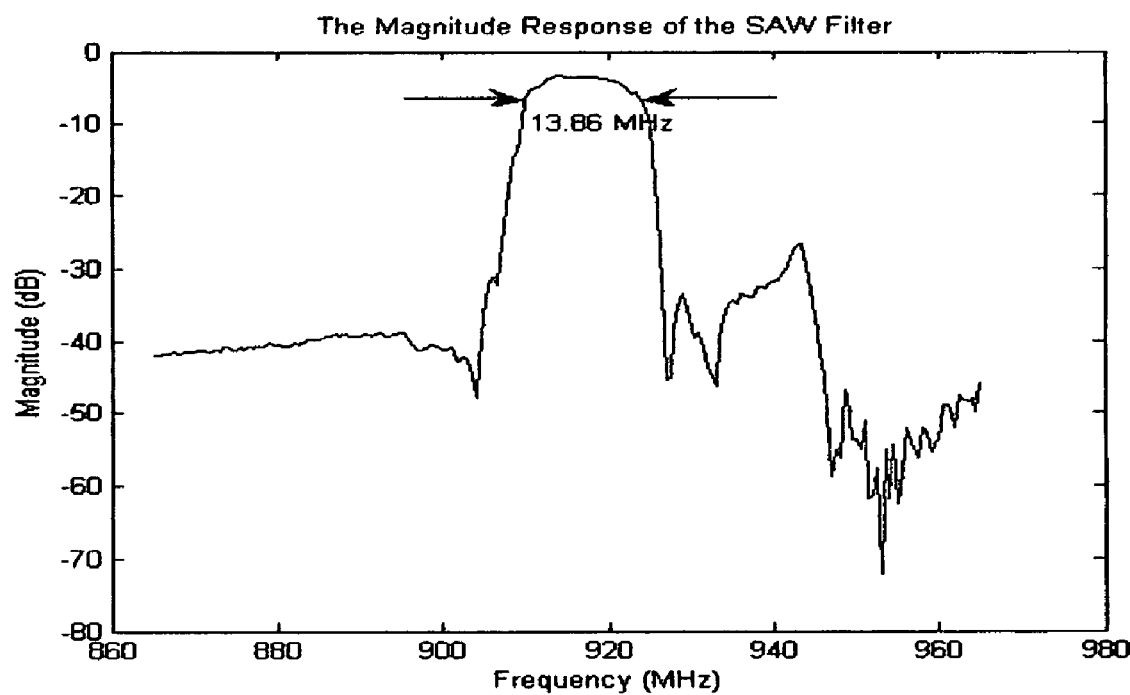
Figure 2: Dirac Delta Function
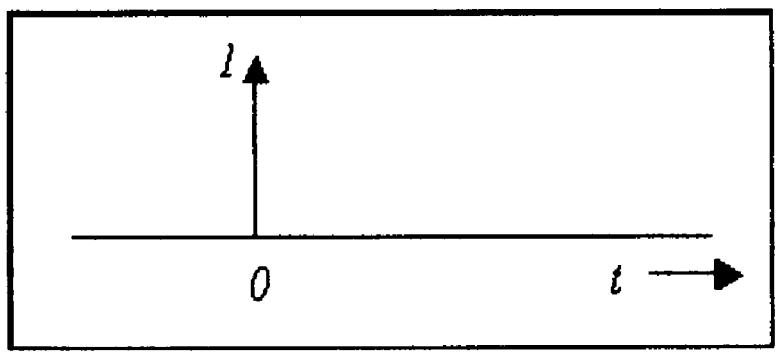

Impulse response of the 14MHz SAW filter

Pulse Train of five 1nsec 50% duty cycle pulses

Figure 5: Output Response of Saw Filter (five 1nsec pulses with 50 % duty cycle)
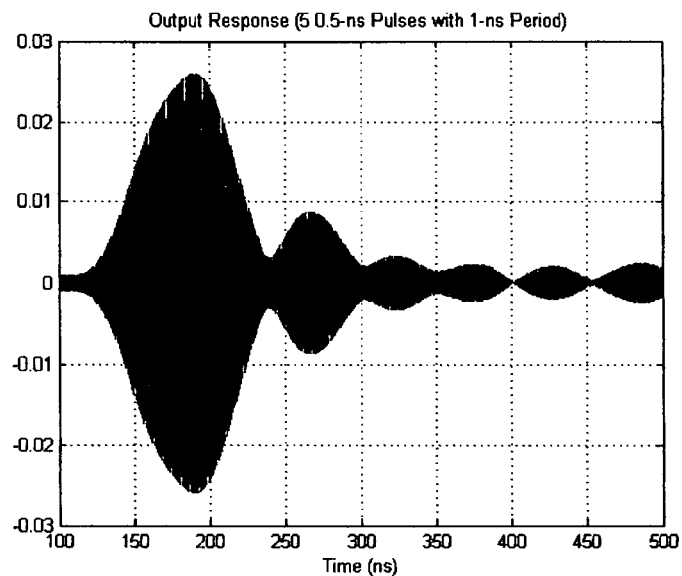
Figure 6
Table 1
| No. of Pulses | Peak Power in dBm |
|---|---|
| 3 | -24.49 |
| 4 | -22.7 |
| 5 | -21.73 |
| 6 | -21.38 |
| 7 | -21.62 |
Figure 7: Pulse Train of five 2nsec 50% duty cycle pulses
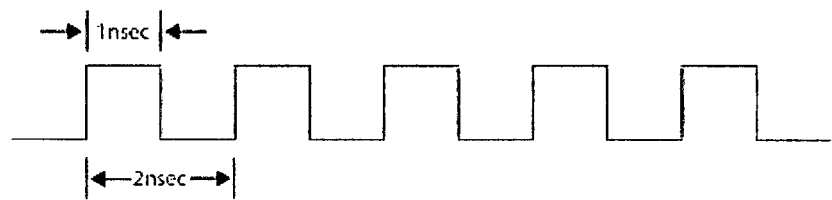

Figure 8: Output Response of Saw Filter (five 2nsec pulses with 50 % duty cycle)

Table 2

| Peak output amplitude of saw filter (in dBm) | | | | | | |
|---|---|---|---|---|---|---|
| | Period of the Pulses | | | | | |
| No Of Pulses | 0.2nsec | 0.4nsec | 1nsec | 1.108nsec | 1.6nsec | 2.0nsec |
| 3 | -38.75 | -47.78 | -24.49 | -23.68 | -36.21 | -39.13 |
| 4 | -41.32 | -37.65 | -22.7 | -21.21 | -44.28 | -40.27 |
| 5 | -50.82 | -43.72 | -21.73 | -19.32 | -36.98 | -44.68 |
| 6 | -48.22 | -42.12 | -21.38 | -17.79 | -41.03 | -55.42 |
| 7 | -40.66 | -37.74 | -21.62 | -16.51 | -38.14 | -46.17 |

Figure 10
Table 3
| Pulse Amplitude (Vpp) | Peak Output amplitude of saw filter (in dBm) |
|---|---|
| 1 | -16.51 |
| 2 | -10.49 |
| 3 | -6.97 |
| 4 | -4.47 |
| 5 | -2.53 |
Figure 11: two inputs AND/NAND gate circuit for Pulse train generation
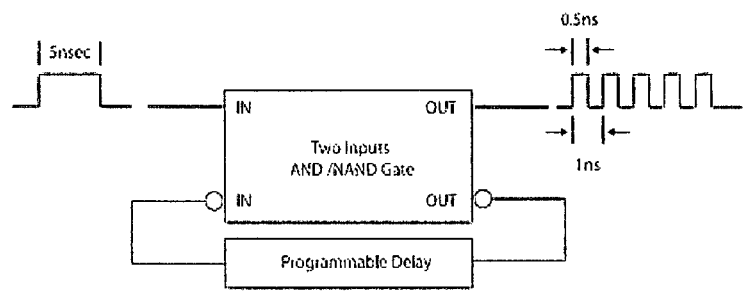
Figure 12: Block diagram of modulator
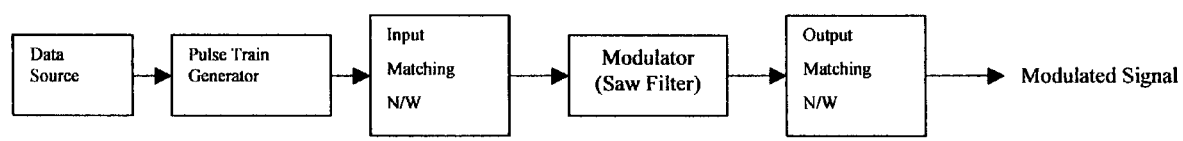

PULSE TRAIN CARRIER-LESS MODULATOR USING SAW FILTERS

CROSS-REFERENCE TO RELATED APPLICATION

The present application claims the benefit of previously filed Provisional Patent Application Ser. No. 60/842,323.

FIELD OF THE INVENTION

This invention addresses the need to transport high bit-rate data over wired or wireless means using specially modulated radio frequency carrier waves. Specifically, a technique is described in this disclosure that uses SAW filters as a modulator in addition to their conventional use as filters. This technique exploits the impulse response of the SAW filter by exciting the filter with a narrow pulse train producing a carrier-less impulse radio system with limited bandwidth, low average power, but high peak power.

BACKGROUND OF THE INVENTION

Modulation is the fundamental process in any communication system. It is a process to impress a message (voice, image, data, etc.) on to a carrier wave for transmission. A band-limited range of frequencies that comprise the message (baseband) is translated to a higher range of frequencies. The band-limited message is preserved, i.e., every frequency in that message is scaled by a constant value. The three key parameters of a carrier wave are its amplitude, its phase and its frequency, all of which can be modified in accordance with an information signal to obtain the modulated signal.

There are various shapes and forms of modulators. For example conventional Amplitude Modulation uses a number of different techniques for modulating the amplitude of the carrier in accordance with the information signal. These techniques have been described in detail in "Modern Analog and Digital Communication Systems" by B. P. Lathi. Similarly conventional Frequency/Phase Modulation uses a number of different methods described in a number of textbooks. In all these techniques, carrier (which is a high frequency sinusoidal signal) characteristics (either amplitude, frequency, phase, or combination of these) are changed in accordance with the data (or information signal). Thus there have been two major components of a modulator. One is the information-carrying signal and the other is the high frequency carrier. An unconventional modulator is described in this document that does not use a carrier for modulation. Modulation is accomplished by exploiting the impulse response of Band Pass Filters.

In a communication system, band pass filters are used to band limit the bandwidth of the signal. For example, they are used in transmitters to allow necessary signal to pass to the next stage and in receivers they are used to block any unwanted signal. They are integral part of any communication system and have numerous advantages. Band Pass filters come in many shapes and forms. Most of the communication systems these days use SAW (Surface Acoustic Wave) filters. Saw filters are band pass filters. They use a piezoelectric crystal substrate with deposited gold electrodes. SAW filters are capable of replacing discrete LC band pass filters in certain wideband applications between 20 MHz and 1 GHz. Their filter skirts, or shape factor are the sharpest of all the filter structures. Since they are etched on a printed circuit board, they save a lot of circuit board real estate and are thus easier to implement. The primary use of SAW filters (as the name implies) is to filter unnecessary signals such as band limiting a transmitter output. A technique for using SAW filters as modulators has been described by the inventor in another patent titled "Carrier-less Modulator using SAW filters", U.S. Application No. 60/781,718, however, the current modulation technique is significantly different than the one described in the earlier patent application. A series of narrow pulses (representing one modulation event) is applied to the input of the SAW filter. The SAW filter, being a resonant device, rings at the fundamental frequency thus modulating the incoming pulse train without using a carrier for modulation.

Communication systems that have emerged in recent years include monopulse and Ultra-Wide Band communication systems. The problem with these systems is that all monopulse or Ultra-Wide Band communications systems form Power Spectrum Densities that tend to span very wide swaths of the radio spectrum. For instance the FCC has conditionally allowed limited power use of UWB from 3.2 GHz to 10 GHz. These systems must make use of very wide sections of radio spectrum because the transmit power in any narrow section of the spectrum is very low. Generally any 4 KHz section of the affected spectrum will contain no more than −42 dbm of UWB spectral power. Correlating receivers are used to "gather" such very wide spectral power and concentrate it into detectable pulses. Interfering signals are problematic. Since the communication system is receiving energy over a very wide spectrum, any interfering signal in that spectrum must be tolerated and mitigated within the receiver. Many schemes exist to mitigate the interference. Some of these include selective blocking of certain sections of spectrum so as not to hear the interferer, OFDM schemes that send redundant copies of the information in the hope that at least one copy will get through interference, and other more exotic schemes that require sophisticated DSP algorithms to perform advanced filtering. In addition, UWB systems have somewhat of a "bad reputation" because they at least have the potential to cause interference. A heated discourse has gone on for years over the potential that UWB systems can cause interference to legacy spectrum users.

Tri-State Integer Cycle Modulation (TICM) and other Integer Cycle Modulation techniques were designed by Joe Bobier and the inventor of this application to help alleviate this massive and growing problem which has now become known by its commercial designation, xG Flash Signaling. Its signal characteristics are such that absolute minimal sideband energy is generated during modulation but that power spectrum density is quite wide relative to the information rate applied. Also, a narrower section of the power spectrum output can be used to represent the same information. The technique of modulation disclosed herein is primarily applicable to these types of single cycle systems.

Like any other band pass filters, SAW filters also have an impulse response. The impulse response depends on the bandwidth of the filter. A technique is described in this disclosure that uses the impulse response of the filter to modulate the incoming data signal without using a carrier for modulation by exciting the filter with a narrow pulse train producing an impulse radio system with limited bandwidth, low average power, but high peak power.

BRIEF SUMMARY OF THE INVENTION

The invention disclosed in this application uses any integer cycle or impulse type modulation and more particularly is designed to work with a method of modulation named Tri-State Integer Cycle Modulation (TICM) which has been previously disclosed in U.S. Pat. No. 7,003,047 issued Feb. 21, 2006, filed by the inventor of this disclosure. In a communication system, band pass filters are used to band limit the bandwidth of the signal. For example, they are used in transmitters to allow necessary signals to pass to the next stage and in receivers they are used to block any unwanted signals. They are integral part of any communication system and have numerous advantages. Band Pass filters come in many shapes and forms. Most of the communication systems these days use SAW (Surface Acoustic Wave) filters. SAW filters are band pass filters. Their filter skirts, or shape factor are the sharpest of all the filter structures. The primary use of SAW filters (as the name implies) is to filter unnecessary signals and are commonly used for band limiting a transmitter output. A technique is described in this document that uses SAW filters as a modulator in addition to their conventional use as filters. This technique exploits the impulse response of the SAW filter by exciting the filter with a narrow pulse train producing a carrier-less impulse radio system with limited bandwidth, low average power, but high peak power.

For a fuller understanding of the nature and objects of the invention, reference should be to the following detailed description taken in connection with the accompanying drawings.

DESCRIPTION OF THE DRAWINGS

For a fuller understanding of the nature and objects of the invention, reference should be made to the accompanying drawings, in which:

FIG. 1 is a representation of typical frequency response of a SAW filter;

FIG. 2 is a representation of a Dirac Delta Function;

FIG. 5 is an output response of a SAW filter;

FIG. 6 is a table showing number of pulses vs. peak power;

FIG. 7 is a representation of a Pulse Train;

FIG. 8 is an output response of a SAW filter;

FIG. 10 is a table showing number of pulses vs. peak power;

FIG. 11 is a representation of a Pulse Train Generator; and

FIG. 12 is a block diagram of a modulator.

DETAILED DESCRIPTION OF THE INVENTION

The invention disclosed in this application uses any integer cycle, ultra-wide band, or impulse type modulation and more particularly is designed to work with a method of modulation named xMax which has been described above.

Consider a SAW filter centered at 915 MHz with a bandwidth of 14 MHz. This type of SAW filter is commonly used for ISM 900 MHz applications like cordless phones, low power transmitters etc. The frequency response of this SAW filter is shown in FIG. 1. While the frequency response of the filter gives no information about the impulse response of such filter, we have to calculate the impulse response of this filter.

Figure 3:
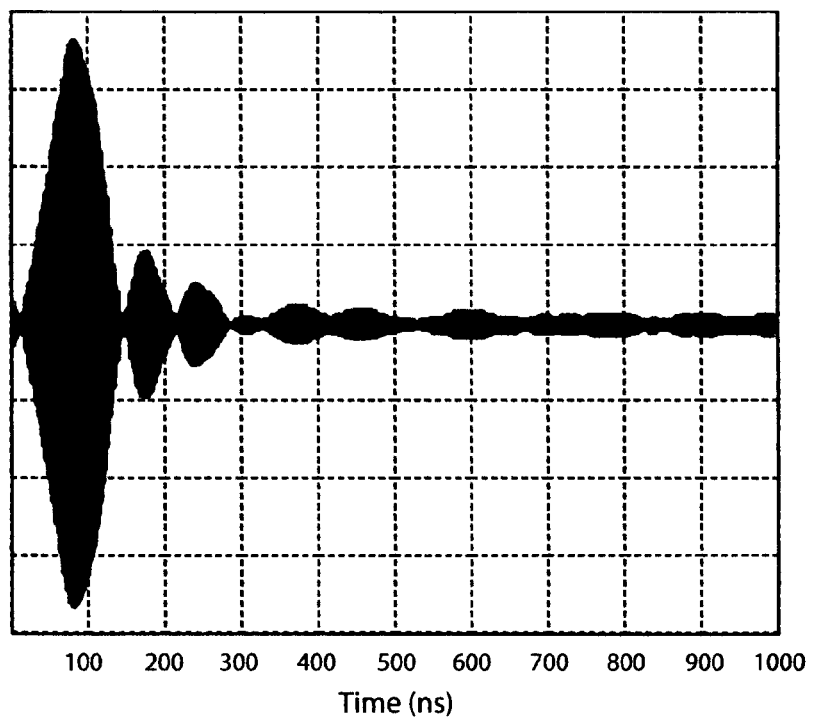
FIG. 3 is a representation of an impulse response of a SAW filter.

The impulse response of a filter is usually derived by passing a Dirac delta signal (simply known as delta function) at the input of the SAW filter. The Delta function is defined as: The Dirac Delta function, often referred to as the unit impulse or delta function, is the function that defines the idea of a unit impulse. This function is one that is infinitesimally narrow, infinitely tall, yet integrates to unity, one. This function can be visualized as shown in FIG. 2:

When such a signal is applied to a SAW filter (described above), an output signal is formed as shown in FIG. 3. From FIG. 3, it is clear that the output of the SAW filter starts at time t=0, grows to a peak amplitude at time t=80 nsec and then starts falling. This process is repeated for a number of times. Even though the input is applied for a very short amount of time, the signal at the output of the SAW filter remains for at least 148.5 nsec. In other words, the SAW filter rings for 148.5 nsec. The wider the bandwidth of SAW filter, the less is the ringing time and vice versa. A frequency domain analysis of FIG. 3 reveals that there are a number of frequencies present when a Dirac input is applied to the SAW filter. These frequencies lie within the bandwidth of SAW filter. Even though the input signal is a unit impulse signal, (frequency=infinite as time=0 as shown in FIG. 2) the output signal has frequency contents that are within the bandwidth of the SAW filter. Therefore in a single cycle system like xG Flash Signaling, instead of modulating the signal (using either digital or analog means) and then passing it through SAW filters, one can apply the signal straight from the encoder to the SAW filter. The impulse response of SAW filter will convert encoded data into a modulated signal that can then be applied to other signal processing blocks like amplifiers, filters, etc. as described in the previous application by the inventor discussed above.

The technique described in this document uses a series of narrow rectangular pulses. These pulses are applied to the input of a saw filter. The output of the saw filter results in a signal similar to the one shown in FIG. 3, however, the amplitude of the output signal depends on the following characteristics of the pulse train:

Number of pulses in the train.

Period of the pulse.

Amplitude of the pulses.

Figure 4:
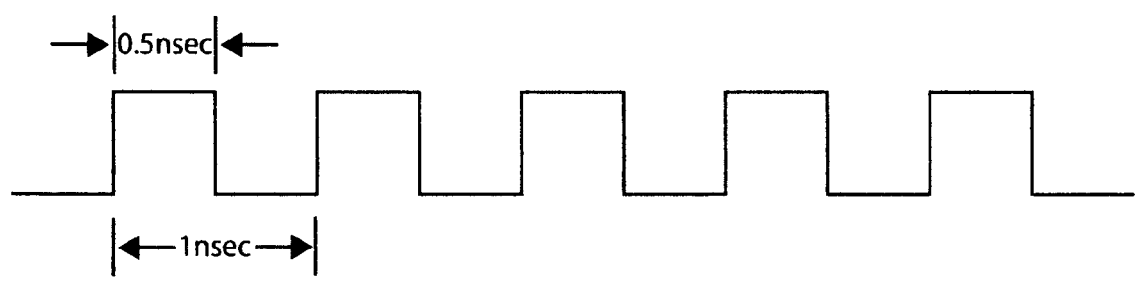
FIG. 4 is a representation of a Pulse Train.

Consider a pulse train of five pulses; the period of the pulses is 1 nsec and the duty cycle is 50%, i.e. the pulses are at logic one level for 0.5 nsec and logic zero level for 0.5 nsec. These pulses are shown in FIG. 4. When such a pulse train is applied to the input of a 21 MHz wide SAW filter, an output is formed as shown in FIG. 5. Notice the peak-to-peak amplitude of the output signal. The peak-to-peak amplitude is approximately 51.82 mVpp=−21.73. If the number of pulses is increased the resulting amplitude changes. FIG. 6, Table 1, shows the relationship between the number of pulses and peak pulse output for a 1 nsec pulse with 50% duty cycle.

Figure 9:
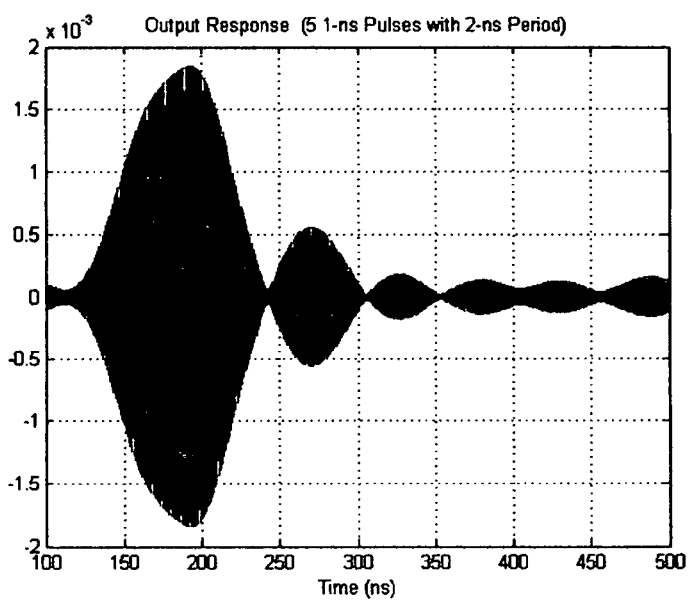
FIG. 9 is a table showing number of pulses vs. peak power.

As mentioned above, the output amplitude of the SAW filter also depends on the period of the pulses. For example consider a pulse train of five pulses where the period of the pulses is 2 nsec. These pulses are shown in FIG. 7. When such a pulse train is applied to the input of a 21 MHz wide saw filter, an output is formed as shown in FIG. 8. Notice the peak-to-peak amplitude of the output signal. The peak-to-peak amplitude is approximately 3.6 mVpp=−44.68 dBm. FIG. 9, Table 2, shows the relationship between the number of pulses, duration of the pulses, and peak amplitude of the SAW filter output:

In Table 1 and Table 2, the amplitude of the input pulses is 1 Vpp. As mentioned earlier, the SAW filter output amplitude also depends on the peak amplitude of the pulses applied at the input of the SAW filter. The output amplitude increases with the increase of the input signal amplitude. For example consider a pulse train of seven pulses; the period of the pulses is 1.109 ns with a 50% duty cycle. If the input amplitude is increased from 1 Vpp to 5 Vpp, the corresponding output amplitude of the SAW filter increases. FIG. 10, Table 3, is derived by changing the input amplitude of the pulses while keeping the period and duty cycle of the pulses constant.

As is well known to those skilled in the art there are a number of ways to generate a pulse train with multiple pulses. Some of the common ways to implement this are using Programmable Logic and using Discrete Digital Hardware. Programming logic devices like FPGA and CPLD can be easily programmed to generate any size pulse train. The I/O pins of these devices should be capable of running at a high speed. A number of discrete digital hardware devices can be used to make any number of pulse trains. One such method is shown in FIG. 1.

The circuit of FIG. 11 is used to generate a pulse train of five pulses each with a period of 1 nsec using a single 5 nsec pulse. A single pulse of 5 nsec is applied to a two input AND/NAND Gate. The inverted output of the gate is fed to its inverted input through a programmable delay chip. The programmable delay can also be implemented using a coaxial cable. The programmable delay is adjusted such that the propagation delay of the AND/NAND gate together with programmable delay equals 1 nsec. A feedback loop is formed from the output of the gate to its input. This circuit produces a pulse train of five pulses with a period of 1 nsec.

A block diagram of a modulator implementing the disclosure of this invention is shown in FIG. 12 and operates as follows. The data source provides encoded index-N data. The data could be single ended or differential. The data format could either be NRZ (Non Return to Zero) or RZ (Return to zero). The peak-to-peak amplitude of this signal can either be programmable or fixed. Since it is a digital signal, it can be TTL, CMOS, ECL, PECL, LVDS or any other logic family. Encoded data from the data source is fed into the Pulse Train Generator circuit. This block can be implemented in a number of ways, two of which were discussed above. There are also shown in FIG. 12 two matching networks. One is placed at the input called "Input matching network" and the other one is called "Output matching Network". The input-matching network transforms the impedance of the pulse train generator into the input impedance of the SAW filter. It is also used to convert differential data output into single ended output. Similarly the output-matching network performs impedance transformation from the SAW filter to the next stage. Matching networks can be implemented using either discrete components or active networks. Any SAW filter with an appropriate bandwidth and appropriate impulse response can be used as modulator.

The following are the advantages of this kind of modulator:
Modulation is accomplished without the use of local oscillator.
Reduces system cost.
Reduces system complexity.
Saves real estate on the printed circuit board.
Reduces overall system power requirements as SAW filters are passive devices.
Reduces the number of amplifiers following the SAW filter as changing the number, period and amplitude of the pulses can increase output amplitude of the SAW filter.

Since certain changes may be made in the above described RF signal modulation system and method without departing from the scope of the invention herein involved, it is intended that all matter contained in the description thereof or shown in the accompanying figures shall be interpreted as illustrative and not in a limiting sense.

What is claimed is:

1. A modulator used to generate a pulse train carrier-less impulse modulated Radio Frequency signal from a data source comprising:
   A Band Pass Filter having a fundamental frequency;
   a pulse train generator in electrical communication with a data source;
   said pulse train generator capable of producing a pulse train of selected pulse numbers, pulse periods, and pulse amplitudes indicating a modulation event when receiving data from said data source;
   an input impedance matching network;
   said input impedance matching network in electrical communication with said pulse train generator and said Band Pass Filter;
   said input impedance matching network configured such that said input impedance matching network transforms the output impedance of said pulse train generator to the input impedance of said Band Pass Filter such that a pulse train indicating a modulation event generated by said pulse train generator is supplied to said Band Pass Filter causing said Band Pass Filter to ring at the fundamental frequency of said Band Pass Filter generating a carrier-less impulse modulated Radio Frequency signal at the output of said Band Pass Filter;
   an output impedance matching network; and,
   said output impedance matching network in electrical communication with the output of said Band Pass Filter and configured such that said output impedance matching network transforms the output impedance of said Band Pass Filter to match input impedances of other stages of a radio system used to broadcast said pulse train carrier-less impulse modulated Radio Frequency signal.

2. The modulator of claim 1 wherein said Band Pass Filter is a Surface Acoustic Wave Filter.

3. A method of generating a pulse train carrier-less impulse modulated Radio Frequency signal comprising:
   Generating a pulse train of selected pulse numbers, pulse periods, and pulse amplitudes indicating a modulation event using a pulse train generator in electrical communication with and receiving a digital signal from a data source;
   transforming the impedance of said pulse train generator to match the input impedance of a Band Pass Filter having a fundamental frequency;
   applying said pulse train to the input of said Band Pass Filter such that said Band Pass Filter rings at the fundamental frequency and a pulse train carrier-less impulse modulated Radio Frequency signal is generated at the output of said Band Pass Filter; and,
   transforming the impedance of the output of said Band Pass Filter to match input impedances of other stages of a radio system used to broadcast said pulse train carrier-less impulse modulated Radio Frequency signal.

4. The method of generating a pulse train carrier-less impulse modulated Radio Frequency signal of claim 3 wherein said Band Pass Filter is a Surface Acoustic Wave Filter.

* * * * *